Nov. 8, 1949 W. L. MASON 2,487,158
TURF PENETRATING IMPLEMENT
Filed April 19, 1946 2 Sheets-Sheet 1
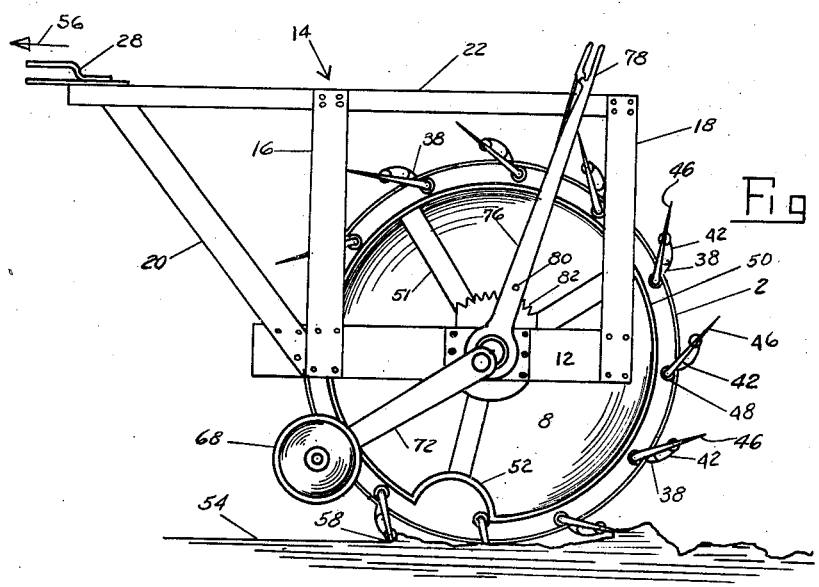
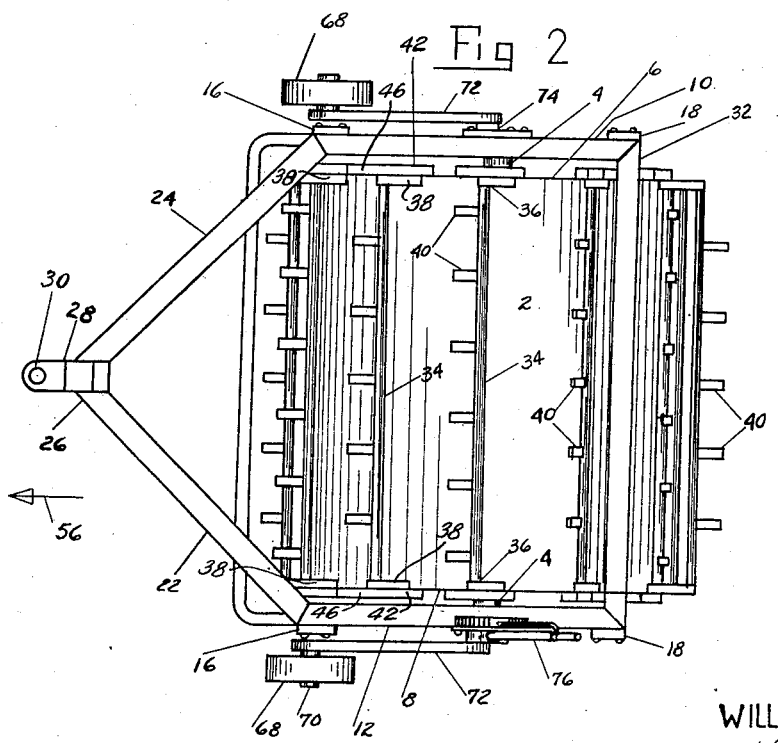
INVENTOR.
WILLIAM L. MASON
BY
ATTORNEYS Nov. 8, 1949          W. L. MASON          2,487,158

TURF PENETRATING IMPLEMENT

Filed April 19, 1946          2 Sheets-Sheet 2

INVENTOR.
WILLIAM L. MASON,
BY
ATTORNEYS.

Patented Nov. 8, 1949

2,487,158

UNITED STATES PATENT OFFICE 2,487,158

TURF PENETRATING IMPLEMENT

William L. Mason, Lincoln, Nebr.

Application April 19, 1946, Serial No. 663,492

2 Claims. (Cl. 97—52)

This invention relates to soil breakers and plows.

An object of this invention is to provide a soil breaker which is simple to construct and effective in operation for breaking the surface of the earth and preparing it for cultivation and other uses.

Another object of this invention is to provide an improved soil breaker which may be filled with water to obtain increased weight, and from which the water may be removed to facilitate drawing the device when not actually engaged in soil breaking.

A further object of the invention is to provide auxiliary wheels upon which the soil breaker may be elevated for moving it so as to prevent damage to the roadway or the teeth of the soil breaker during its movement, when not actually engaged in soil breaking.

Another object of the invention is to provide hinged teeth additionally actuated by a cam upon engaging the earth, for increasing the soil-breaking action.

Other objects and advantages of the invention will become apparent from the following description of a preferred embodiment thereof, as illustrated in the accompanying drawings, and in which:

Figure 1 is a side elevation of my improved soil breaker and plow.

Figure 2 is a plan view of the device shown in Figure 1.

Figure 3 is an enlarged detail view of the lower portion of the device shown in Figure 1 with parts broken away for clearness.

Figure 4 is a fragmentary elevational view of what is shown in Figure 3 with the ground-engaging teeth in different positions.

Figure 5 is a similar view showing one of the soil-breaking teeth in still a different relation with respect to the arcuately-bent in portion.

Figure 6 is a sectional view taken on the line 6—6 of Figure 3.

As illustrated, the soil breaker and plow has a hollow cylindrical drum 2 with axle shaft 4 extending out of opposite drum heads 6 and 8 thereof, the axle being journaled in bearings in horizontal side members 10 and 12 of the draw bar frame 14 which has uprights 16 and 18 on each side, and also diagonal members 20, top members 22 and 24, connecting the upright members and being appropriately bent to meet at 26 where a drawbar-attaching member 28 having a hole 30 is attached. Transverse member 32 bridges laterally across the side members at their upper ends as shown.

Transverse rods 34 are journaled at their ends 36 in bearings 38 secured on the edges of the rim of the drum 2, as illustrated, so that the rods are free to turn in the bearings, that is, about an axis parallel to the axle 4. Each rod 34 is provided with projecting teeth 40, all the teeth 40 on any rod 34 lying in the same plane and secured to the rod so as to rotate therewith.

On the end of each of the rods 34 is a crank or rocker arm 42 having on one end a roller 48 and on the opposite end a ground-engaging point or finger 46, the crank 42 being rigidly attached as at 44, intermediate its ends to the rods 34.

Adjacent to each of the heads 6 and 8 of the drum 2 is a cam ring 50, the cam ring being carried by radially-disposed arms 51 which are loosely mounted upon the axle 4. The arms 51 are fixedly secured to the horizontal side members 12 of the draw bar frame 14. The cam rings 50 are so positioned as to always assume substantially the position shown in Figure 1, relative to the ground, with the arcuately bent-in portion 52 of the cam rings near the ground 54. As will be noted, the cam rollers 48 on the cranks 42 ride on and follow the contour of the surface of the cam rings 50.

As the machine is drawn by tractor, horse, or otherwise in the direction of the arrow 56, the drum 2 revolves in a counter-clockwise direction on axle 4, causing each ground-engaging finger 46 in turn to dig into the ground, as at 58 in Figure 1. When the rotation of the drum 2 carries the finger 46 downward to a position such that it has cleared the cam shoulder 62 of the arcuately-bent end portion 52 of the cam ring 50, its roller 48 has just entered the portion 52, the position shown in Figure 4, for initiating its travel along the portion 52. The shifting of the finger 46 of the crank 42 and its roller 48 to the aforesaid position permits the crank 42 to straighten out radially as shown in Figures 4 and 5. This pivots the cranks 42 and the rods 34, thus turning the teeth 40 through an arc radially outward to sharply engage and break the soil as they sweep through it. When the drum 2 has been rotated to an extent such that the roller 48 of the crank 42 has reached the limit of its travel through the bent-in portion 52 and engages the cam shoulder 64, the position shown in Figure 3, the finger 46 of the crank 42 is pivoted sharply counter-clockwise so that the finger and its corresponding teeth 40 sharply sweep through the soil again, breaking it up to a marked degree. This action continues successively as each finger 46 engages the ground and engages and leaves the bent-in portion 52 of the cam rings 50. The result is a considerably improved breaking of the ground, and the further advantage is that the ground is softened and not given a hard surface underneath. Extra weight is provided by filling the drum 2 with water, through suitable openings.

Auxiliary wheels 68 are carried on axles 70 on the lower ends of supports 72, the upper ends of the supports 72 being secured to shafts 74 eccentrically of axles 4. Lever arm 76 is pivoted at its lower end about axle 4 in such a manner as to engage and carry the supports 72 in a clockwise direction when the handle 78 is moved clockwise, thus raising the wheels 68 off the ground, a pawl 80 engaging teeth 82 to hold the wheels 68 up until released. To elevate the machine on the wheels 68, it is only necessary to move the handle 78 counter-clockwise, thus raising the machine and supporting it on the wheels 68, so it may be moved over ground which is not to be broken.

If desired, the elements designated as teeth 40 may be made in the form of scoops or blades wider than the teeth 40, so as to displace more earth as the cylinder turns. The device as shown is intended to be supported during transportation on the wheels 68. A third supporting wheel may be secured beneath the drawbeam 28 if desired, to thus support the device on three wheels, making it more stable and avoiding the imposition of additional weight forward of drawbar 28 which is especially desirable when horse traction is used.

Although I have described an embodiment of my invention in specific terms, it is to be understood that various changes may be made in size, shape, materials and arrangement without departing from the spirit and scope of the invention.

I claim:

1. A ground breaker comprising a frame including draw bar means, a drum rotatably mounted in said frame, a plurality of transversely-disposed rods arranged about the peripheral surface of said drum and pivotally mounted on the latter, each of said rods being provided with a plurality of ground-engaging teeth spaced from each other and projecting therefrom, a cam ring adjacent each end of said drum and fixedly secured to said frame, each of said rings being provided with an arcuately-bent in portion, and a crank arranged on each of the ends of said rods and rigidly attached to said rods, each of said cranks carrying a roller, the rollers of the respective cranks being in engagement with the cam ring complemental thereto.

2. A ground breaker comprising a frame including a draw bar means, a drum rotatably mounted in said frame, a plurality of transversely-disposed rods arranged about the peripheral surface of said drum and pivotally mounted on the latter, each of said rods being provided with a plurality of ground-engaging teeth spaced from each other and projecting therefrom, a cam ring adjacent each end of said drum and fixedly secured to said frame, each of said rings being provided with an arcuately-bent in portion, and a crank rigidly secured to each of the ends of said rods, said crank having a roller on one end and having a ground-engaging finger on the opposite end, the rollers of the respective cranks being in engagement with the cam rings complemental thereto.

WILLIAM L. MASON.

REFERENCES CITED

The following references are of record in the file of this patent:

UNITED STATES PATENTS

| Number | Name | Date |
|---|---|---|
| 38,109 | Hewit | Apr. 7, 1863 |
| 1,015,003 | Chambers | Jan. 16, 1912 |
| 1,027,125 | Guidinger | May 21, 1912 |
| 1,898,214 | Richards | Feb. 21, 1933 |
| 2,039,166 | Hoepfner | Apr. 28, 1936 |
| 2,325,997 | Kelly et al. | Aug. 3, 1943 |

FOREIGN PATENTS

| Number | Country | Date |
|---|---|---|
| 410,731 | France | Mar. 21, 1910 |